United States Patent
Kabuto et al.

(10) Patent No.: US 8,341,661 B2
(45) Date of Patent: Dec. 25, 2012

(54) SYSTEM AND METHOD FOR TRANSMITTING A VIDEO SIGNAL FROM A TRANSMITTER TO A RECEIVER AND READING AND WRITING EDID

(75) Inventors: Nobuaki Kabuto, Kunitachi (JP); Takashi Doi, Fuchu (JP); Hideki Ohkita, Kunitachi (JP); Masahiko Mawatari, Yokohama (JP)

(73) Assignees: Hitachi Consumer Electronics Co., Ltd., Tokyo (JP); Toshiba Corporation, Tokyo (JP)

(*) Notice: Subject to any disclaimer, the term of this patent is extended or adjusted under 35 U.S.C. 154(b) by 333 days.

(21) Appl. No.: 12/631,022

(22) Filed: Dec. 4, 2009

(65) Prior Publication Data

US 2010/0199298 A1 Aug. 5, 2010

(30) Foreign Application Priority Data

Dec. 19, 2008 (JP) ................................. 2008-323878

(51) Int. Cl.
*H04N 7/16* (2011.01)

(52) U.S. Cl. ............... 725/25; 725/26; 725/27; 725/28; 725/29; 725/30; 725/31; 725/105; 725/116; 725/117; 725/126; 379/81; 379/82; 379/83; 379/84; 379/85; 345/204; 348/571; 348/739; 386/326; 358/1.15; 358/527

(58) Field of Classification Search .................... None
See application file for complete search history.

(56) References Cited

U.S. PATENT DOCUMENTS

| 7,818,466 | B2 * | 10/2010 | Rainho Almeida et al. ..... 710/10 |
| 2004/0039927 | A1 * | 2/2004 | Hazama et al. ............... 713/189 |
| 2006/0269056 | A1 * | 11/2006 | Montag ......................... 380/205 |
| 2007/0070402 | A1 * | 3/2007 | Kitayama et al. ............ 358/1.15 |
| 2007/0133812 | A1 * | 6/2007 | Yoshizawa et al. ............. 381/27 |

(Continued)

FOREIGN PATENT DOCUMENTS

| EP | 1 926 317 | 5/2008 |
| EP | 2 046 036 | 4/2009 |
| JP | 2006-246300 | 9/2006 |
| JP | 2007-028645 | 2/2007 |
| JP | 2008-252819 | 10/2008 |
| WO | WO 2006/057324 | 6/2006 |

OTHER PUBLICATIONS

Office Action issued in Japanese Patent Application No. 2008-323878 on May 8, 2012.

*Primary Examiner* — Nasser Goodarzi
*Assistant Examiner* — Paul Graham
(74) *Attorney, Agent, or Firm* — Antonelli, Terry, Stout & Kraus, LLP.

(57) ABSTRACT

The present invention relates to system and method of reading and rewriting EDID in a video transmission system includes a transmitter transmitting a video signal and a receiver receiving the video signal that the transmitter transmitted which are connected to each other through digital interface, the method includes a reading step where the transmitter reads the EDID of the receiver through the digital interface; a first transmitting step where the transmitter transmit the video signal to the receiver on the basis of the EDID which the transmitter read; a second transmitting step where the receiver transmits a first message related to the EDID of the receiver; and a third transmitting step where the receiver transmits a second message related to the EDID of the receiver; wherein the transmitter, which received the first message from the receiver, does not read the EDID of the receiver until the second message is received.

2 Claims, 11 Drawing Sheets

U.S. PATENT DOCUMENTS

| | | |
|---|---|---|
| 2007/0165038 A1* | 7/2007 | Chiba et al. .................. 345/520 |
| 2007/0177466 A1* | 8/2007 | Ando et al. ................. 369/13.01 |
| 2007/0186015 A1* | 8/2007 | Taft et al. ....................... 710/16 |
| 2007/0222779 A1* | 9/2007 | Fastert et al. ................ 345/418 |
| 2007/0242062 A1* | 10/2007 | Guo et al. ..................... 345/204 |
| 2008/0092246 A1 | 4/2008 | Shintani |
| 2008/0127312 A1 | 5/2008 | Iwamoto et al. |
| 2008/0168118 A1* | 7/2008 | Hickey et al. ................ 709/201 |
| 2008/0222703 A1 | 9/2008 | Mantani |
| 2008/0247544 A1 | 10/2008 | Candelore et al. |
| 2011/0096935 A1* | 4/2011 | Yoshizawa et al. ............ 381/59 |
| 2011/0271296 A1* | 11/2011 | Tu et al. .......................... 725/25 |

* cited by examiner

| | INTERFACE | HDMI | DVI | DISPLAY PORT |
|---|---|---|---|---|
| (1) | VIDEO/AUDIO TRANSMISSION SCHEME | TMDS | TMDS | Main Link |
| (2) | EDID READING/CP AUTHENTICATION — COMMUNICATION | DDC | DDC | AUX-CH |
| (3) | EDID READING/CP AUTHENTICATION — TRIGGER | HPD | HPD | HPD |
| (4) | LOW-SPEED BIDIRECTIONAL COMMUNICATION | CEC | DDC | AUX-CH |
| (5) | CP SCHEME | HDCP | HDCP | HDCP/DPCP |
| (6) | SCHEME ALTERNATIVE TO HPD (TRIGGER AND COMMUNICATION) | CEC | DDC | AUX-CH |

SYSTEM AND METHOD FOR TRANSMITTING A VIDEO SIGNAL FROM A TRANSMITTER TO A RECEIVER AND READING AND WRITING EDID

BACKGROUND OF THE INVENTION (1) Field of the Invention

The present invention relates to an interface for transmitting a digital video signal including an audio signal.

(2) Description of the Related Arts

Digital interfaces for transmitting a digital video signal, such as an HDMI (High Definition Multimedia Interface), a DVI (Digital Visual Interface), and a DisplayPort have been provided from the past.

These digital interfaces are used for transmitting a digital video signal from a video transmitter to a video receiver. The video transmitter is, for example, a digital recorder such as a DVD (Digital Versatile Disc) reproducing device, a STB (Set Top Box), or a personal computer. The video receiver is, for example, a video display device such as a monitor for a television or a personal computer.

In the case of connection through a digital interface such as the HDMI, a CP (Contents Protection, namely, copyright protection) technique such as an HDCP (High-bandwidth digital Contents Protection) is employed, and transmission and reception of a video signal is enabled only when the video transmitter and the video receiver are successfully authenticated.

However, a conventional authentication operation is executed while a HPD terminal is changed its level High to Low to High not only the time of power-on reset of the video receiver, but also every time when the display switch to another input terminal or data related to the characteristics of the video receiver are rewritten. Accordingly, the video transmitter cannot read the data related to the characteristics of the video receiver until the data rewriting is completed, which leads to problems that a video cannot be displayed or an interruption time of a video is long.

Japanese Patent Application Laid-Open No. 2008-252819 describes an example in which data related to the characteristics of a video receiver are rewritten in accordance with a state of the video receiver.

Japanese Patent Application Laid-Open No. 2006-246300 describes an example of a display when authentication fails, but does not describe eliminating or shortening of a video interruption time caused by switching of the input terminal or rewriting of data related to the characteristics of a video receiver

SUMMARY OF THE INVENTION

In view of the foregoing problems, the present invention provides a data reading method, and a video transmitter and a video receiver using the same in which there is no video interruption time or a video interruption time is short during switching of a display or data rewriting.

The present invention provides a video transmitter which transmits a digital video signal obtained by performing a contents protection process to a video receiver through digital interfaces, wherein during a period when the video transmitter reads data related to the characteristics of the video receiver and transmits a digital video signal generated on the basis of the read data by a default setting process to be executed at the time of power-on reset of the video receiver to the video receiver, when receiving a re-reading request message for the data from the video receiver through a bidirectional communication line incorporated into the digital interfaces, the data related to the characteristics of the video receiver are read and the video signal generated on the basis of the read setting data is transmitted to the video receiver.

According to the present invention, it is possible to provide a data reading method, and a video transmitter and a video receiver using the same in which no interruption of a video occurs or a video interruption time is shorted due to no change in the signal level of the HPD terminal, even when data related to the characteristics of the video receiver are rewritten.

DETAILED DESCRIPTION OF THE ILLUSTRATED EMBODIMENT

Hereinafter, embodiments of the present invention will be described in detail with reference to the accompanying drawings. It should be noted that constituent elements having common functions are given the same reference numerals in the respective drawings, and the explanations thereof will be omitted as much as possible to avoid duplication of the explanations.

First Embodiment

Figure 1:
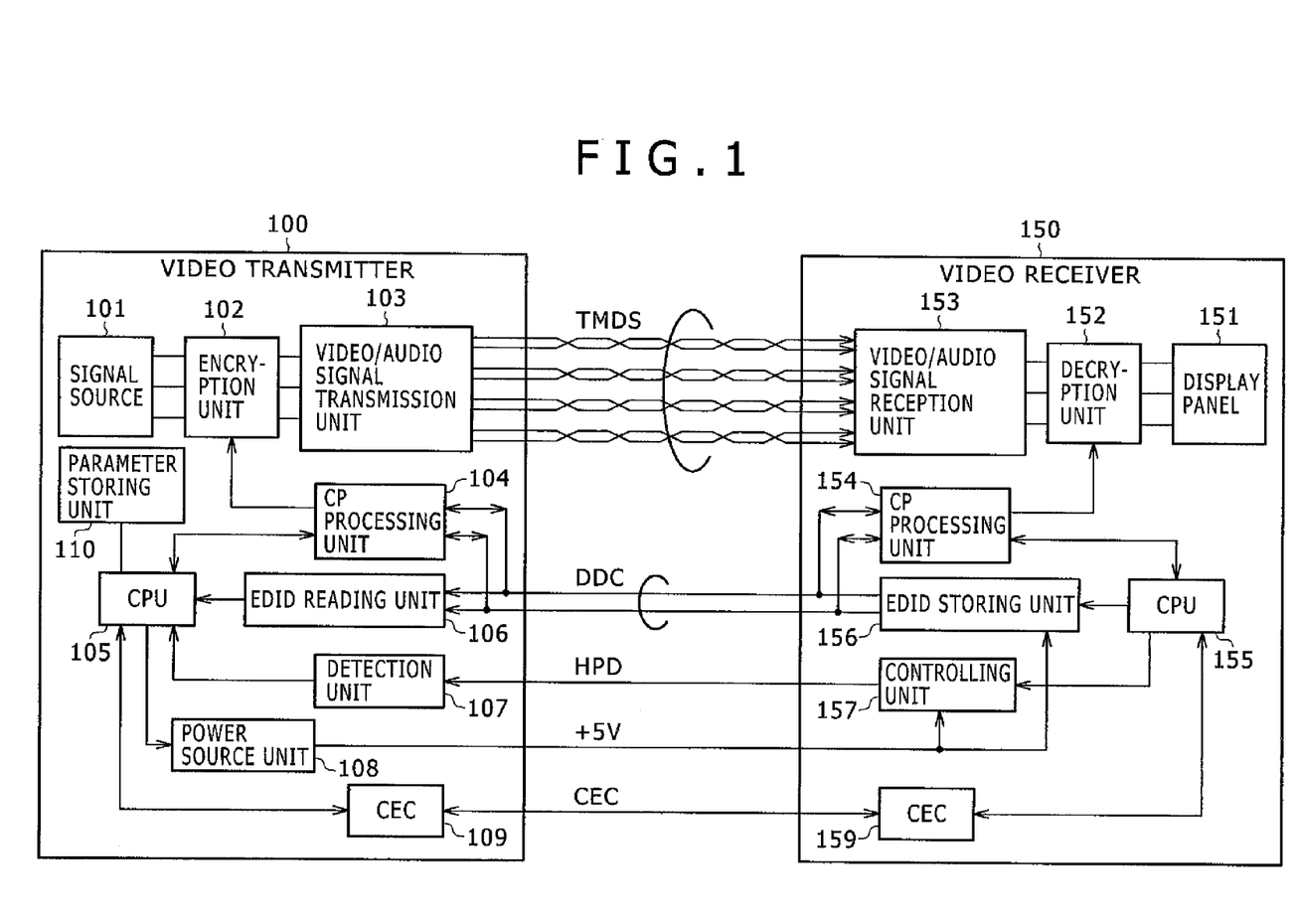
FIG. 1 is a block diagram showing an embodiment of configurations of a video transmitter and a video receiver according to the present invention.

FIG. 1 is a block diagram showing an embodiment of configurations of a video transmitter and a video receiver according to the present invention, and the both are connected to each other through an HDMI. The reference numeral 100 denotes a video transmitter which generates and transmits a digital video signal, and 150 denotes a video receiver. In the video transmitter 100, the reference numeral 101 denotes a signal source, 102 denotes an encryption unit, 103 denotes a video/audio signal transmission unit, 104 denotes a CP processing unit, 105 denotes a CPU (Central Processing Unit), 106 denotes an EDID (Extended Display Identification Data) reading unit, 107 denotes a detection unit, 108 denotes a power source unit, 109 denotes a CEC (Consumer Electronics Control) unit, and 110 denotes a parameter storing unit. In addition, in the video receiver 150, the reference numeral 151 denotes a display panel, 152 denotes a decryption unit, 153 denotes a video/audio signal reception unit, 154 denotes a CP processing unit, 155 denotes a CPU, 156 denotes an EDID storing unit which stores the data of the characteristics of the receiver, 157 denotes a controlling unit, and 159 denotes a CEC unit.

In FIG. 1, the video transmitter 100 is controlled by the CPU 105, and the video receiver 150 is controlled by the CPU 155. Further, each of these CPUs 105 and 155 is operated by a user through an MI (Man-Machine Interface) device including a remote controller (not shown) attached to the video transmitter 100 or the video receiver 150.

Further, the video transmitter 100 and the video receiver 150 are coupled to each other through an HDMI cable.

In the video transmitter 100, the signal source 101 is a video signal source such as an external video input terminal, a DVD, or a broadcast reception unit, and outputs a video signal to the encryption unit 102. The encryption unit 102 encrypts (contents protection process) the input video signal with, for example, an HDCP to be output to the video/audio signal transmission unit 103. The video/audio signal transmission unit 103 converts the input video signal into a serial transmission method of a TMDS (Transmission Minimized Differential Signaling) method, and transmits the resultant to the video/audio signal reception unit 153 of the video receiver 150 through a TMDS signal line.

At this time, the CP processing unit 104 performs authentication regarding to whether or not the video receiver 150 that is the connection target is provided with a legitimate HDCP processing function, through the CP processing unit 154 and a DDC (Display Data Channel) signal line. If authenticated, the CP processing unit 104 outputs key information of encryption to the encryption unit 102. Specifically, the encryption unit 102 transmits a video signal obtained by performing a contents protection process for the input video signal on the basis of the key information input from the CP processing unit 104, and accordingly, the video receiver 150 cannot decrypt the video signal without the key information by which the video signal obtained by performing the contents protection can be decrypted.

It should be noted that as the TMDS method, a well-known technique described in, for example, Japanese Patent Application Laid-Open No. 2007-28645 is used.

The power source unit 108 generates a DC voltage of +5V from an AC power source (not shown) supplied to the video transmitter, and supplies the voltage to the EDID storing unit 156 and the controlling unit 157 of the video receiver 150 through a +5V power source line.

The EDID reading unit 106 reads EDID from the EDID storing unit 156 of the video receiver 150 through the DDC signal line, and outputs the received EDID to the CPU 105. While the CPU 105 sets a format of a video signal or an audio signal to be transmitted on the basis of the input EDID to store the format setting parameter (a format information) into the parameter storing unit 110, the CPU 105 gives an instruction on an output format of the video signal or the audio signal to the signal source 101. Then, the CPU 105 controls the video/audio signal transmission unit 103 not to transmit the video signal until the initialization and the above-described CP process are completed.

In the case where the detection unit 107 detects a HPD (Hot Plug Detect) signal transmitted from the controlling unit 157 of the video receiver 150 through a HPD signal line, the detection unit 107 outputs the detected information of the HPD signal to the CPU 105.

The CEC unit 109 mutually transmits and receives a CEC control signal such as a remote control signal or a power-on/standby signal to/from the CEC unit 159 of the video receiver 150 through a CEC signal line.

In the video receiver 150, a video or audio signal transmitted from the video transmitter 100 is received by the video/audio signal reception unit 153, and the signal is restored from the serial transmission method to the video signal in the original format to be output to the decryption unit 152. Further, the CP processing unit 154 outputs the key information obtained through the authentication with the CP processing unit 104 of the video transmitter 100 to the decryption unit 152.

The decryption unit 152 performs a decryption process for the video signal input from the video/audio signal reception unit 153 by using the key information obtained from the CP processing unit 154, and outputs the resultant to the display panel 151 on which the video is displayed.

The EDID storing unit 156 stores data representing the characteristics of the video receiver 150, and the EDID is transmitted through the DDC signal line in accordance with a reading operation of the EDID reading unit 106 of the video transmitter 100.

When the system is started, the controlling unit 157 transmits the HPD signal as a trigger to the detection unit 107 of the video transmitter 100.

The CEC unit 159 mutually transmits and receives the CEC control signal to/from the CEC unit 109 of the video transmitter 100 through the CEC signal line to control the timing of transmission and reception.

Figure 9:
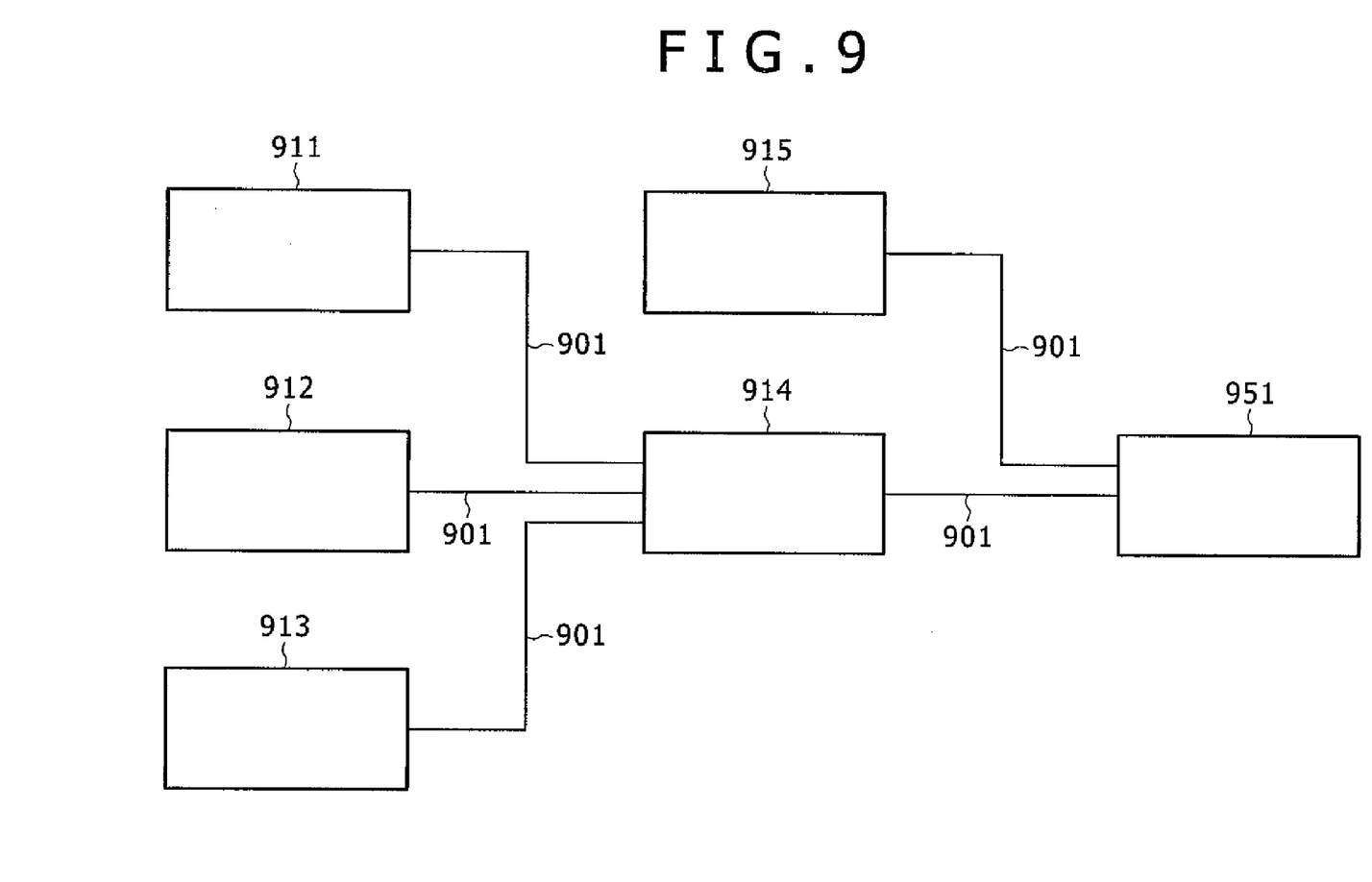
FIG. 9 is a block diagram showing an embodiment of configurations of a video transmitter and a video receiver according to the present invention.

FIG. 9 is a block diagram showing the embodiment of configurations of the video transmitter and the video receiver according to the present invention. The reference numeral 911 denotes a DVD (Digital Versatile Disc), 912 denotes a D-VHS (Digital-Video Home System), 913 denotes an STB (Set Top Box), 914 denotes an Audio Amp, 915 denotes a PVR (Personal Video Recorder), 951 denotes a television (hereinafter, referred to as TV), and 901 denotes HDMI cables.

In FIG. 9, the devices on the left side and the right side are the video transmitter and the video receiver, respectively, which are connected to each other through the HDMI cables 901. Further, for example, the DVD 911 as a video transmitter can be coupled to the TV 951 as a video receiver through the HDMI cable 901, the Amp 914 and the HDMI cable 901.

Figure 4:
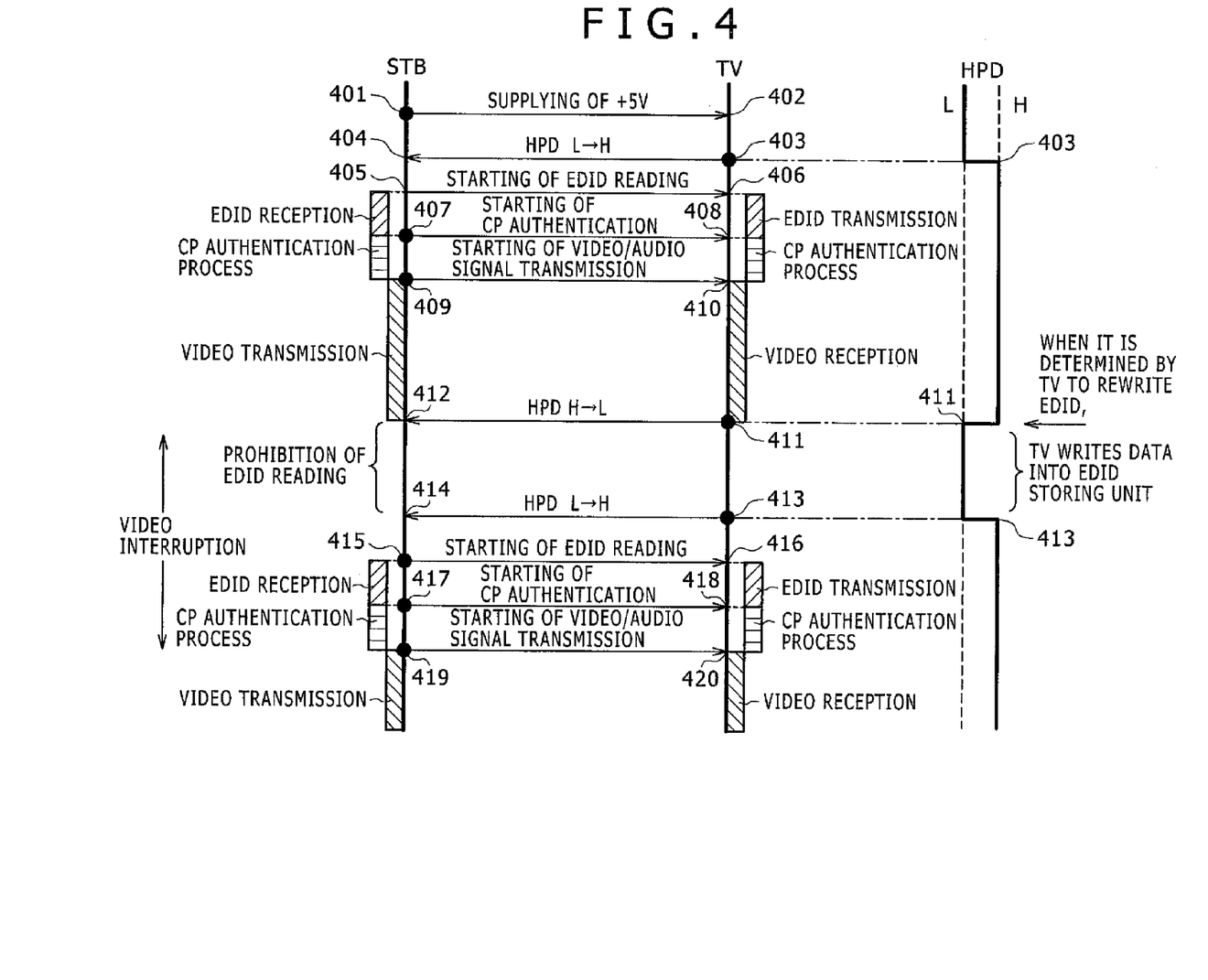
FIG. 4 is a sequence diagram showing an example of operations of a conventional EDID rewriting process and a conventional CP authentication process.
Figure 5:
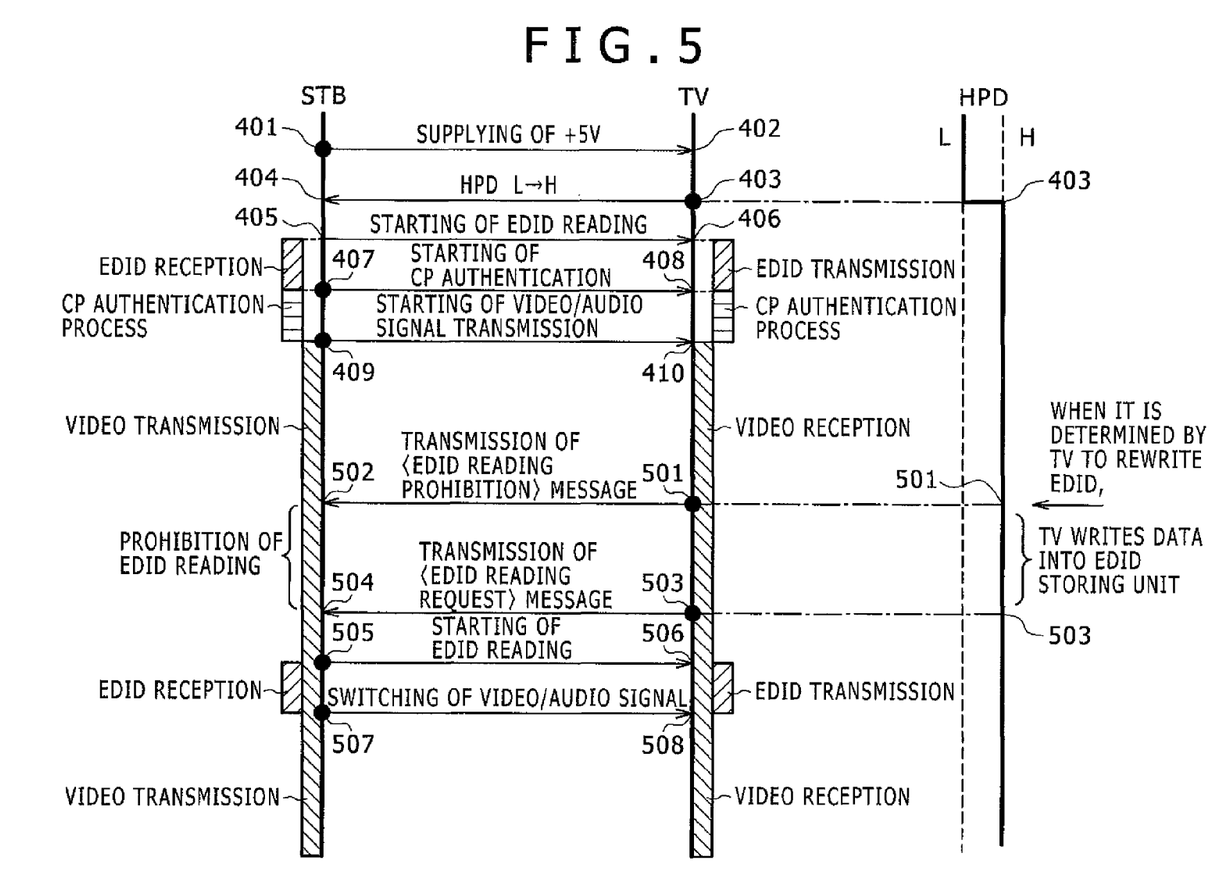
FIG. 5 is a sequence diagram showing an embodiment of an EDID reading processing operation according to the present invention.

Next, an EDID reading process of the present invention will be described using FIGS. 4 and 5. FIG. 4 is a sequence diagram showing an example of operations of a conventional EDID reading process and a conventional CP authentication process. In addition, FIG. 5 is a sequence diagram showing the embodiment of an EDID reading processing operation according to the present invention. In each case, the video transmitter and the video receiver are connected to each other through the HDMI.

In each of FIGS. 4 and 5, the video transmitter is represented as STB and the video receiver is represented as TV. Further, the HDMI cable is used for coupling the STB to the TV, and changes in the level of the HPD signal in each sequence operation of the STB and the TV are shown on the right side. Further, in FIGS. 4 to 7, time passes from the top to the bottom of each drawing, and a time indicated on each horizontal line (dashed-dotted line) in the lateral axis direction is the same time.

Figure 7:
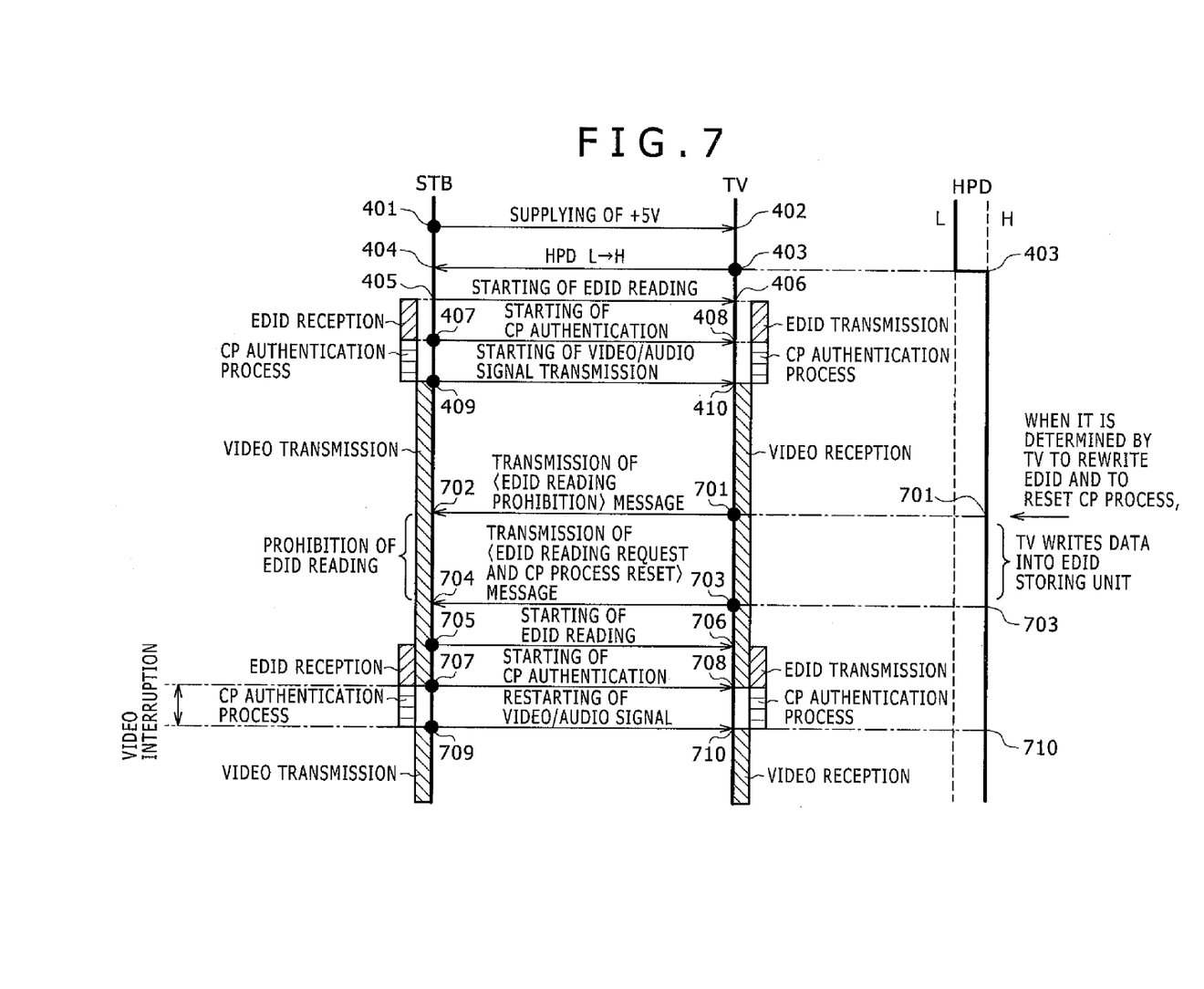
FIG. 7 is a sequence diagram showing an embodiment of an EDID reading processing operation and a CP process reset operation according to the present invention.

As for the HPD signal level in each of FIGS. 4 and 7, "H" represents a high level (for example, 2.7V to 5.0V), and "L" represents a low level (for example, 0.0V to 0.4V).

In FIG. 4, a voltage of +5V is started to be supplied from the STB to the TV through the +5V power source line at a time 401, and inputting of the power to the TV is started at a time 402. As a result, it is detected that the HPD signal level is raised from "L" to "H" between a time 403 and a time 404 in the TV, and the HPD signal level becomes "H" at the time 404 in the STB.

When the HPD signal level is changed from "L" to "H", the level change of the HPD signal triggers reading of the EDID and CP authentication in the STE. Specifically, in response to the result in which the "H" level is detected, the STB starts to read the EDID at a time 405, and the TV transmits the EDID at a time 406 in accordance with the reading operation of the STB. After reading the EDID, the STB starts to perform the CP authentication for the TV at a time 407. The TV starts to perform the CP authentication process for the STE at a time 408. Specifically, the STB reads the EDID to set a video format to be output on the basis of the EDID, and performs the CP authentication process.

When the CP authentication process succeeds, the STB starts to transmit the video signal to the TV (time 409). When the operation of the CP authentication process is completed, the TV starts to receive the video signal (starting of video/audio signal transmission) at a time 410.

As described above, in the case where it is determined by the TV to rewrite the EDID at a time 411 in a state where the video signal is transmitted from the STB and is received by the TV, the HPD signal level is switched from "H" to "L". At a time 412, the TV starts to write new data to the EDID storing unit 156 at a HPD signal level of "L". Then, in the case where the writing of data is completed at a time 413, the HPD signal level is switched from "L" to "H".

In the case where the HPD signal level is detected as "L" at the time 412, the STB prohibits the reading of the EDID from the EDID storing unit 156. In the case where the HPD signal level is detected as "H" at a time 414, the level change triggers the STB to start to read the EDID from the EDID storing unit 156 at a time 415.

The following sequence operations from a time 415 to a time 419 and a time 420 are the same as those from the time 405 to the time 409 and the time 410, and thus, the explanations thereof will be omitted.

As described above, in the case where it is determined by the TV to rewrite the EDID at the time 411, transmission of the video is interrupted from, for example, the time 412 to the time 419, and reception of the video is interrupted from the time 411 to the time 420.

As described above by using FIG. 4, in the case where it is determined by the TV to rewrite the EDID during transmission and reception of the video signal, it is necessary to interrupt the transmission and reception of the video signal in the conventional technique. Further, since the CP authentication process is performed, an interruption time of a video becomes long. Thus, even in the case where it is determined by the TV to rewrite the EDID during transmission and reception of the video signal, no interruption of a video occurs, or interruption time of a video is shortened in the present invention, as the embodiment shown in the following FIGS. 5 to 7.

In FIG. 5, the processing operations from the time 401 when a power source voltage of +5V is supplied to the time 410 when transmission and reception operations of the video signal are started (starting of video/audio signal transmission) are the same as those in the conventional example of FIG. 4. Thus, the explanations thereof will be omitted and an explanation will be made from the process next to the time 410.

For example, in the case where it is determined by the TV to rewrite the EDID at a time 501 during transmission and reception of the video signal, the CPU 155 (see FIG. 1) transmits a message (controlling command) for prohibiting the reading of the EDID from the CEC unit 159 to the CEC unit 109 of the STB through the CEO signal line. At this time, the HPD signal is still at the "H" level.

The CEC unit 109 of the STB receives the message for prohibiting the reading of the EDID to be passed on to the CPU 105 at a time 502. Accordingly, the CPU 105 prohibits the EDID reading processing operation.

In the case where the rewriting is completed, the TV transmits a reading request message (controlling command) for the EDID from the CEC unit 159 to the CEC unit 109 of the STB through the CEC signal line at a time 503. Accordingly, the CPU 105 can read the EDID. Specifically, the STB which received the reading request message for the EDID at a time 504 allows the EDID reading unit 106 to start to read the EDID of the EDID storing unit 156 of the TV through the DDC signal line from a time 505. At this time, the HPD signal is still at the "H" level. It should be noted that the TV writes the EDID from the time 501 to the time 504.

The STB which reset the format or the like of an output video signal on the basis of the read EDID starts to transmit the video/audio signal from the video/audio signal transmission unit 103 to the TV at a time 507. At this time, the HPD signal is still at the "H" level.

As described above, the video in the format on the basis of the EDID rewritten from the time 501 to the time 503 is displayed on the display panel 151 of the TV after a time 508.

According to the embodiment of FIGS. 1 and 5, in the video signal transmission and reception system in which the video transmitter and the video receiver are coupled to each other by the HDMI method, default setting of a video output format is performed on the basis of the EDID when the power is supplied, and then, the CP authentication process is performed, so that transmission and reception of the video signal is started. After transmission and reception of the video signal is started, a change in the level of the HPD signal is not used when it is necessary to rewrite the EDID, but the messages (controlling commands) for prohibiting the reading of the EDID and for requesting to read the EDID which are communicated through the CEG signal line are used. Accordingly, it is possible to realize the video transmitter and the video receiver in which no interruption of a video occurs, the CP authentication is not needed, and switching of the video/audio signal is fast even when the EDID is rewritten.

In the embodiment of FIG. 5, the STB adds a message for notifying handling information to the EDID reading prohibition message or the EDID reading request message so as to ensure recognizing of a state in the video signal transmission and reception system including the STB and the TV, thus enhancing the reliability. For example, upon reception of a message indicating that prohibition setting is completed for the EDID reading prohibition message, rewriting of the EDID is started on the TV side. Accordingly, it is possible to avoid an abnormal operation in which the reading of the EDID is started by the STB when the EDID reading prohibition message is not delivered to the STB due to some false operation. This is similarly applied to other embodiments of the present invention to be described later.

In the above-described embodiment, the HPD signal is used for initialization only right after the power is supplied (or right after input switching) while being changed from Low to High. However, in case the mechanism of the EDID reading prohibition or the EDID reading request by means of the message malfunctions, the HPD signal is preferentially used when the HPD signal is changed to the low level, and the operation performed by means of the message may be stopped.

Figure 6:
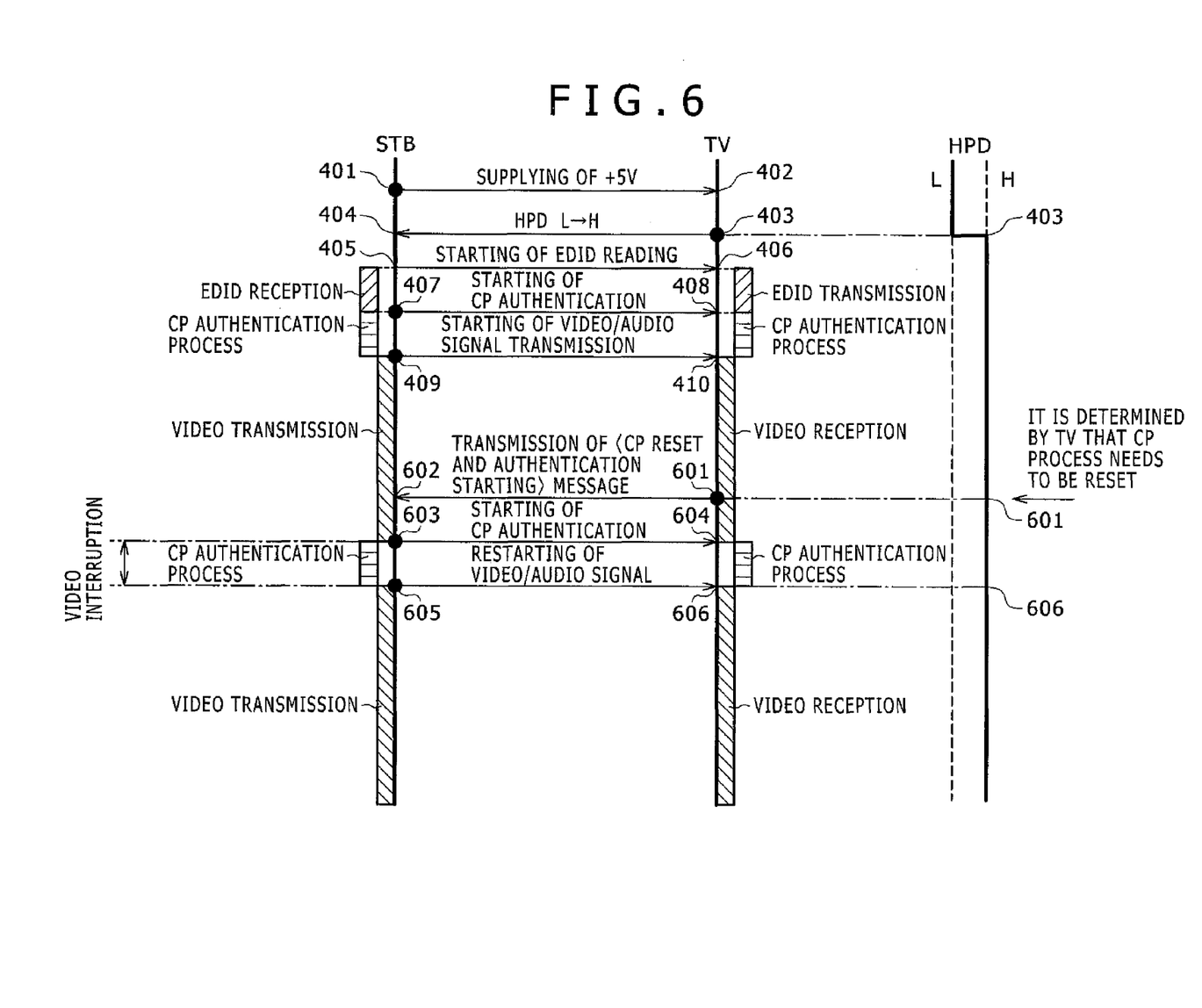
FIG. 6 is a sequence diagram showing an embodiment of a CP process reset operation according to the present invention

Next, the CP authentication process of the present invention will be described using FIG. 6. FIG. 6 is a sequence diagram showing the embodiment of a CP process reset operation of the present invention, and signal processing is performed by the HDMI method shown in FIG. 1.

In FIG. 6, the processing operations from the time 401 when a DC power source voltage of +5V is supplied to the time 410 when transmission and reception operations of the video signal are started are the same as those in the conventional example of FIG. 4. Thus, the explanations thereof will be omitted and an explanation will be made from the process next to the time 410.

For example, in the case where it is determined by the TV that the CP process needs to be reset at a time 601 during transmission and reception of the video signal, the CEC unit 159 outputs a CP reset and authentication starting message to the CEC signal line under control of the CPU 155 (see FIG. 1) of the TV. The CEC unit 109 of the STB receives the same message to be passed on to the CPU 105. At this time, the HPD signal is still at the "H" level.

After the CEC unit 109 receives the CP reset and authentication starting message at a time 602, the CPU 105 of the STB instructs the CP processing unit 104 of the STB to start the CP authentication with the TV. From a time 603, the CP processing unit 104 of the STB and the CPU processing unit 154 of the TV start the CP authentication process. The CP processing unit 104 outputs key information obtained as a result of the CP authentication process to the encryption unit 102. From a time 605, the video/audio signal transmission unit 103 starts to transmit the video signal encrypted by the encryption unit 102 on the basis of the key information to the TV through the TMDS signal line. The video/audio signal reception unit 153 of the TV receives the encrypted video signal to be passed on to the decryption unit 152 of the TV. From a time 606, the decryption unit 152 decrypts the input video signal on the basis of the key information supplied from the CP processing unit 154 to be displayed on the display panel 151. At this time, the HPD signal is still at the "H" level.

According to the embodiment of FIG. 6, in the video signal transmission and reception system in which the video transmitter and the video receiver are coupled to each other by the HDMI method, default setting of a video output format is performed on the basis of the EDID when the power is supplied, and then the CP authentication process is performed, so that the video interfaces are initialized. After transmission and reception of the video signal is started, a change in the level of the HPD signal is not used as a reset signal for the CP process, but the CP reset and authentication starting message (controlling command) which is communicated through the CEC signal line is used. Accordingly, it is possible to realize the video transmitter and the video receiver in which switching of the video/audio signal is fast because even when the CP process is reset, the reading operation of the EDID is not necessary and an interruption time of a video can be shortened.

Next, there will be described a case, using FIG. 7, in which both of the EDID reading process and the CP process reset operation of the present invention are performed. FIG. 7 is a sequence diagram showing the embodiment of the EDID reading process and the CP process reset operation of the present invention, and signal processing is performed by the HDMI method shown in FIG. 1.

In FIG. 7, the processing operations from the time 401 when a DC power source voltage of +5V is supplied to the time 410 when transmission and reception operations of the video signal are started are the same as those in the conventional example of FIG. 4. Thus, the explanations thereof will be omitted and an explanation will be made from the process next to the time 410.

For example, in the case where it is determined by the TV to rewrite the EDID and to reset the CP process at a time 701 during transmission and reception of the video signal, the CPU 155 (see FIG. 1) transmits a message for prohibiting the reading of the EDID from the CEC unit 159 to the CEC unit 109 of the STB through the CEC signal line. The CPU 105 of the STB which received the message of prohibiting the reading of the EDID at a time 702 controls so as not to perform the reading of the EDID until the EDID reading request message is received.

From a time 701, the TV starts to rewrite the EDID of the EDID storing unit 156 and the rewriting is completed at a time 703. When the rewriting is completed, the CPU 155 transmits an EDID reading request and CP process reset message from the CEC unit 159 to the CPU 105 through the CEC unit 109 of the STB. At this time, the HPD signal is still at the "H" level. Thus, the message for prohibiting the reading of the EDID is used for triggering data rewriting.

The CPU 105 of the STB which received the EDID reading request and CP process reset message at a time 704 requests the EDID storing unit 156 of the TV to read the EDID at a time 705. The EDID storing unit 156 starts to transmit the EDID at a time 706. Next, at a time 707 when the STB completes the reading of the EDID, the CP processing unit 104 of the STB transmits a CP process starting message to start the CP authentication process with the CP processing unit 154 of the TV.

Upon reception of the CP process starting message from the STB, the CP processing unit 154 of the TV performs the CP authentication with the CP processing unit 104 of the STB at a time 708, and the video is interrupted during the CP authentication process (from a time 707 to a time 709). However, at this time, the HPD signal is still at the "H" level.

When the CP processing unit of the STB completes the CP authentication, the STB starts to transmit the video signal on the basis of the rewritten EDID and the CP authentication from the video/audio signal transmission unit 103 to the video/audio signal reception unit 153 of the TV at a time 709. The TV receives the video signal on the basis of a new result of CP authentication and the EDID transmitted from the STB, so that the received video signal is decrypted and displayed on the basis of the new CP authentication at a time 710. At this time, the HPD signal is still at the "H" level.

According to the embodiment of FIG. 7, in the video signal transmission and reception system in which the video transmitter and the video receiver are coupled to each other by the HDMI method, default setting of a video output format is performed on the basis of the EDID when the power is supplied, and then the CP authentication process is performed, so that the video interfaces are initialized. After transmission and reception of the video signal is started, a change in the level of the HPD signal is not used as a trigger signal for rewriting the EDID, but the message (controlling command) for prohibiting the reading of the EDID which is communicated through the CEC signal line is used. Accordingly, it is possible to realize the video transmitter and the video receiver in which an interruption time of a video is short even when the EDID is rewritten and the CP process is reset after transmission and reception of the video signal is started.

It should be noted that if items of the embodiment of FIGS. 5 to 7 are replaced by those shown in a comparison table of FIG. 8, to be described later, in FIG. 2 (second embodiment) and FIG. 3 (third embodiment) to be described later, the embodiment can be similarly conducted even in a DVI method and a DisplayPort method.

Figure 10:
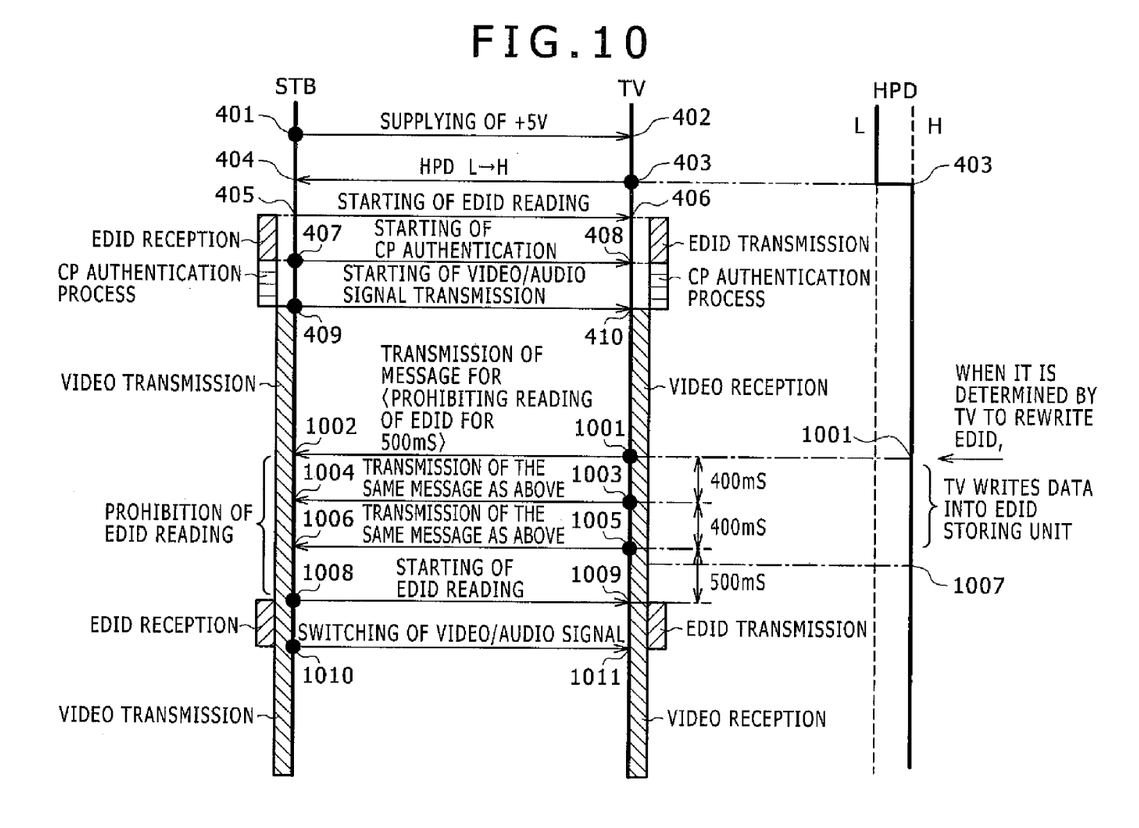
FIG. 10 is a sequence diagram showing an embodiment of an EDID reading processing operation according to the present invention.

FIG. 10 is a sequence diagram showing the embodiment of an EDID reading processing operation of the present invention. In the embodiment of FIG. 5, the CEC unit 159 of the TV transmits the message for prohibiting the reading of the EDID only when writing is started, and transmits the EDID reading request message after completion of writing. In addition, the STB prohibits the reading of the EDID when the STB receives one message for prohibiting the reading of the EDID, and prohibits the reading of the EDID until the STB receives the EDID reading request message. However, in the embodiment of FIG. 10, the message for prohibiting the reading of the EDID may be transmitted to the STB at predetermined time intervals (cycles), for example, intervals of 400 ms (times 1001, 1003, and 1005) during a period of rewriting the EDID in the EDID storing unit 156, and the reading of the EDID may be prohibited every time the STB receives the message during a predetermined period longer than the predetermined cycle, for example, up to 500 ms after reception of the message.

In this case, the TV transmits the message for prohibiting the reading of the EDID at the predetermined intervals from the time (a time 1001) rewriting of the EDID in the EDID storing unit 156 is started, and does not transmit the same after completion of the rewriting (a time 1007). Thus, the TV may be operated on the assumption that the reading request message is received 500 ms later from the reception of the last message for prohibiting the reading of the EDID.

An example of a structure of the message described above is shown in FIGS. 11A to 11E. Each message includes a Header 811, an Op Code 812, an Op Data 813 related to a destination Physical Address, and an OP Data 814 (824, 834, or 844) representing reading prohibition.

Figure 11A:
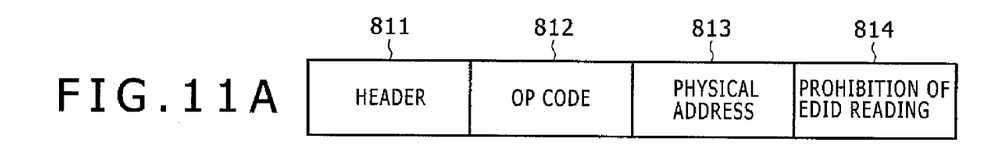
FIGS. 11A to 11E are diagrams for explaining a message structure according to the present invention.
Figure 11B:
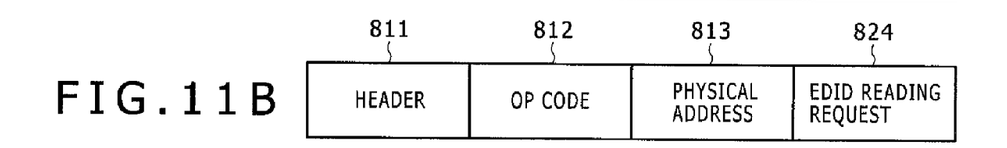
Figure 11C:
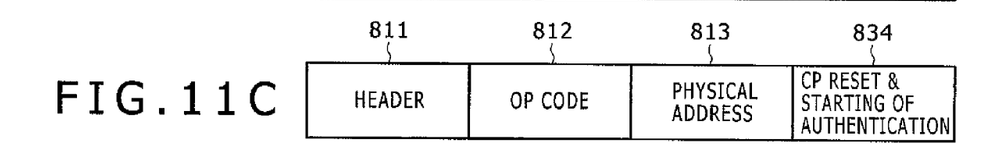
Figures 11D, 11E:
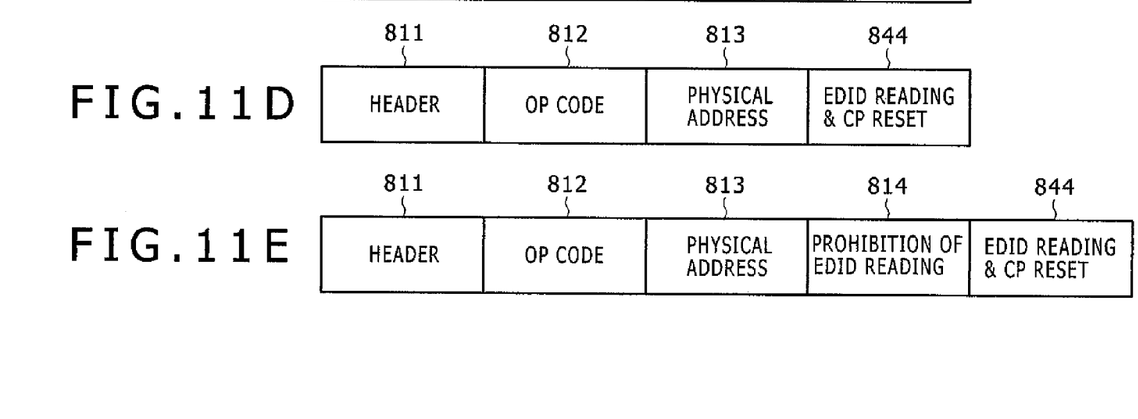

FIG. 11A represents a message for showing EDID reading prohibition, FIG. 11B represents a message for showing an EDID reading request, FIG. 11C represents a message for showing CP reset and starting of authentication, and FIG. 11D represents a message for showing an EDID reading request and CP authentication initialization. Each message has one Op Data other than the Physical Address. However, in order to reduce a message frequency, in FIG. 11E, it is advantageous in enhancing the usage efficiency of a low-speed communication line if the EDID reading prohibition Op Data and two pieces of OP Data representing the EDID reading and the CP authentication initialization are carried by one message. The EDID reading prohibition Op Data and two pieces of Op Data representing the EDID reading and the CP authentication initialization may be collectively defined as one piece of Op Data.

At this time, it is preferable that a time period from the EDID reading prohibition to the EDID reading is set to 100 ms or longer from the viewpoint of compatibility with a conventional HDMI device with HDCP. Further, it is desirable that the time period is set to less than 500 ms because a long time period leads to delay of response.

According to the present invention, it is possible to always set the HPD signal at the "H" level. Thus, the embodiment may be applied to a case in which a HPD terminal is considered to be always at the high level except for the time right after power supplying and another signal is transmitted to the HPD terminal.

Second Embodiment

Figure 2:
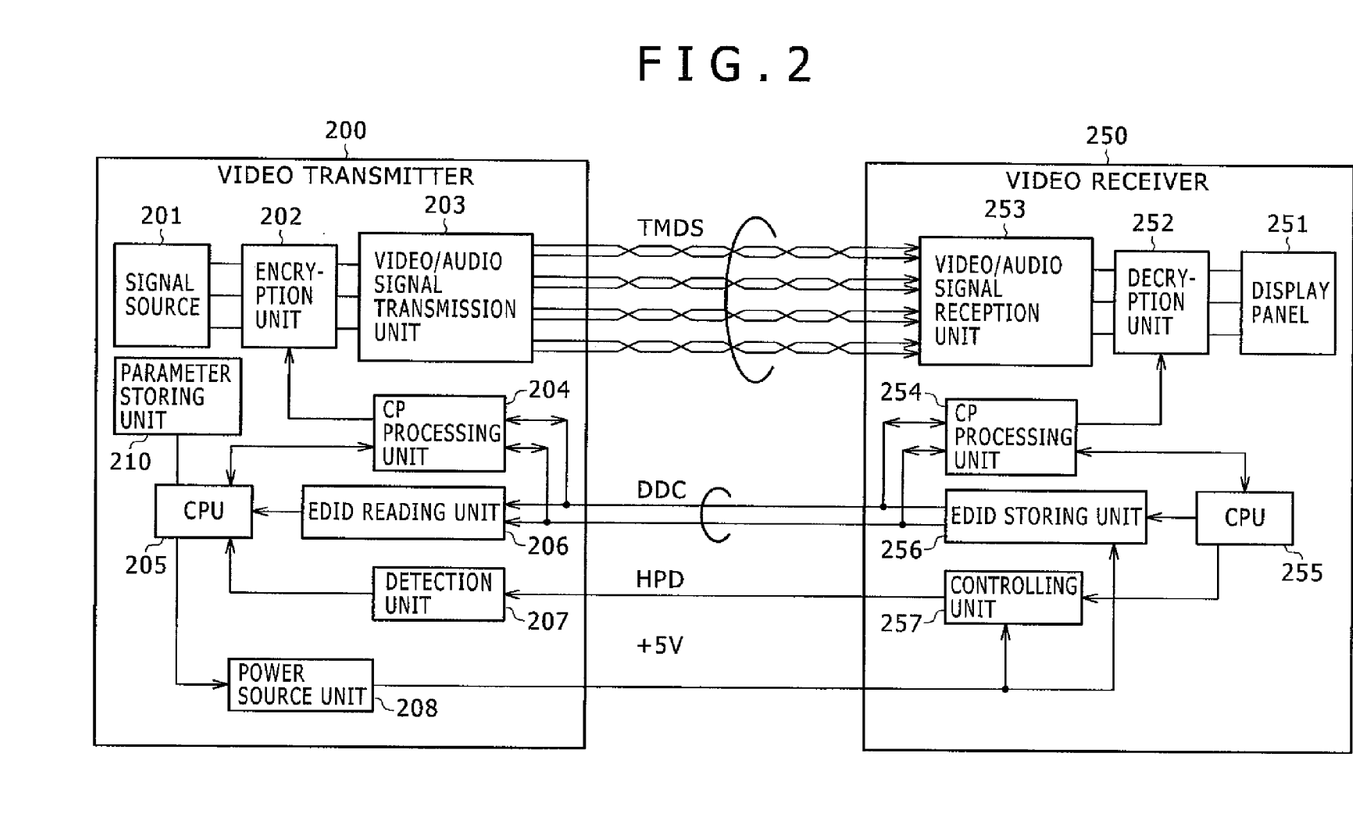
FIG. 2 is a block diagram showing an embodiment of configurations of a video transmitter and a video receiver according to the present invention.

FIG. 2 is a block diagram showing an embodiment of configurations of a video transmitter and a video receiver according to the present invention, and the both are configured by interfaces of a DVI method. The reference numeral 200 denotes a video transmitter which generates and transmits a digital video signal, and 250 denotes a video receiver. In the video transmitter 200, the reference numeral 201 denotes a signal source, 202 denotes an encryption unit, 203 denotes a video signal transmission unit, 204 denotes a CP processing unit, 205 denotes a CPU, 206 denotes an EDID reading unit, 207 denotes a detection unit, 208 denotes a power source unit, and 210 denotes a parameter storing unit. In addition, in the video receiver 250, the reference numeral 251 denotes a display panel, 252 denotes a decryption unit, 253 denotes a video signal reception unit, 254 denotes a CP processing unit, 255 denotes a CPU, 256 denotes an EDID storing unit, and 257 denotes a controlling unit.

In FIG. 2, the video transmitter 200 is controlled by the CPU 205, and the video receiver 250 is controlled by the CPU 255. Further, each of these CPUs 205 and 255 is operated by a user through an MMI device including a remote controller (not shown) attached to the video transmitter 200 or the video receiver 250.

Further, the video transmitter 200 and the video receiver 250 are coupled to each other through a DVI cable.

In the video transmitter 200, the signal source 201 is a video signal source, and outputs a video signal to the encryption unit 202. The encryption unit 202 encrypts the input video signal with, for example, an HDCP to be output to the video signal transmission unit 203. The video signal transmission unit 203 converts the input video signal into a serial transmission method of a TMDS method, and transmits the resultant to the video signal reception unit 253 of the video receiver 250 through a TMDS signal line.

At this time, the CP processing unit 204 performs authentication with the CP processing unit 254 regarding to whether or not the video receiver 250 that is the connection target is provided with a legitimate HDCP processing function, through a DDC signal line. If authenticated, the CP processing unit 204 outputs key information of encryption to the encryption unit 202. Specifically, the encryption unit 202 transmits a video signal obtained by performing a contents protection process for the input video signal on the basis of the key information input from the CP processing unit 204, and accordingly, the video receiver 250 cannot decrypt the video signal without the key information by which the copy protection signal can be decrypted.

The power source unit 208 generates a DC power source voltage of +5V from an AC power source (not shown) supplied to the video transmitter, and supplies the voltage to the EDID storing unit 256 and the controlling unit 257 of the video receiver 250 through a +5V power source line.

The EDID reading unit 206 reads EDID from the EDID storing unit 256 of the video receiver 250 through the DDC signal line, and outputs the received EDID to the CPU 205. While the CPU 205 sets a format of a video signal to be transmitted on the basis of the input EDID to store the format information into the parameter storing unit 210, the CPU 205 gives an instruction on an output format of the video signal to the signal source 201. Then, the CPU 205 controls the video signal transmission unit 203 not to transmit the video signal until the initialization and the above-described CP process are completed.

In the case where the detection unit 207 detects a HPD signal transmitted from the controlling unit of the video receiver 250 through a HPD signal line, the detection unit 207 outputs the detected information of the HPD signal to the CPU 205.

In the video receiver 250, a video signal transmitted from the video transmitter 200 is received by the video signal reception unit 253, and the signal is restored from the serial transmission method to the video signal in the original format to be output to the decryption unit 252. Further, the CP processing unit 254 performs authentication with the CP processing unit 254 regarding to whether or not the video transmitter 200 that is the connection target is provided with a legitimate HDCP processing function, through the DDC signal line. If authenticated, the CP processing unit 254 outputs key information of encryption to the decryption unit 252. Specifically, the decryption unit 252 performs a decryption process for the input video signal on the basis of the key information input from the CP processing unit 254, and outputs the resultant to the display panel 251 on which the video is displayed.

As described above, in the case where the information signal capable of decrypting the video signal obtained by performing a contents protection process is input, the decryption unit 252 decrypts the input video signal to be output to the display panel 251 on which the video is displayed.

The EDID storing unit 256 stores data representing the characteristics of the video receiver 250, and the EDID is transmitted through the DDC signal line in accordance with a reading operation of the EDID reading unit 206 of the video transmitter 200.

When the system is started, the controlling unit 257 transmits the HPD signal as a trigger to the detection unit 207 of the video transmitter 200.

Third Embodiment

Figure 3:
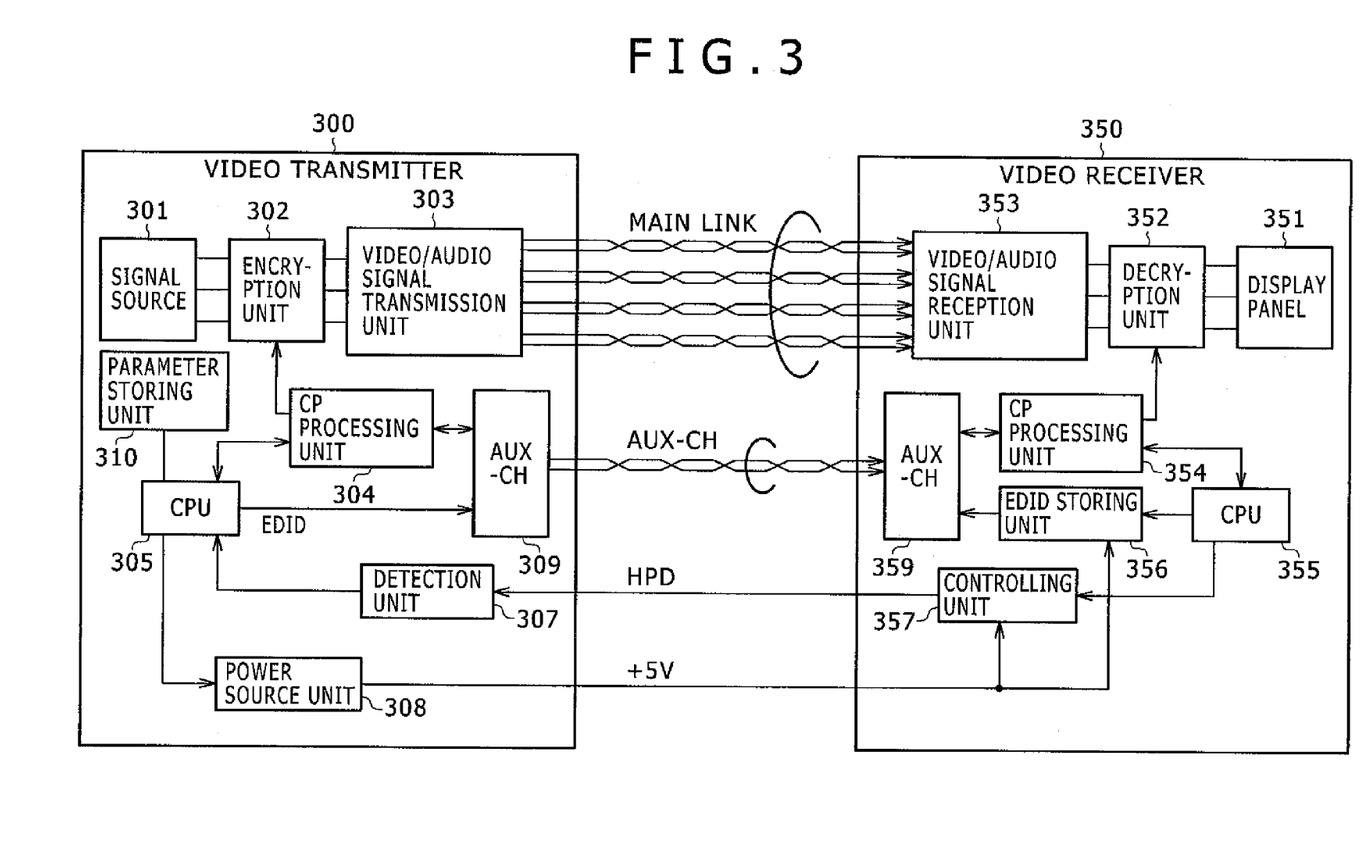
FIG. 3 is a block diagram showing an embodiment of configurations of a video transmitter and a video receiver according to the present invention.

FIG. 3 is a block diagram showing an embodiment of configurations of a video transmitter and a video receiver according to the present invention, and the both are configured by interfaces of a DisplayPort method. The reference numeral 300 denotes a video transmitter which generates and transmits a digital video signal, and 350 denotes a video receiver. In the video transmitter 300, the reference numeral 301 denotes a signal source, 302 denotes an encryption unit, 303 denotes a video/audio signal transmission unit, 304 denotes a CP processing unit, 305 denotes a CPU, 309 denotes an AUX-CH (Auxiliary-Channel) unit, 307 denotes a detection unit, 308 denotes a power source unit, and 310 denotes a parameter storing unit. In addition, in the video receiver 350, the reference numeral 351 denotes a display panel, 352 denotes a decryption unit, 353 denotes a video/audio signal reception unit, 354 denotes a CP processing unit, 355 denotes a CPU, 359 denotes an AUX-CH unit, 356 denotes an EDID storing unit, and 357 denotes a controlling unit.

In FIG. 3, the video transmitter 300 is controlled by the CPU 305, and the video receiver 350 is controlled by the CPU 255. Further, each of these CPUs 305 and 355 is operated by a user through an MMI device including a remote controller (not shown) attached to the video transmitter 300 or the video receiver 350.

Further, the video transmitter 300 and the video receiver 350 are coupled to each other through a DisplayPort cable.

Communications between the CP processing unit 304 of the video transmitter 300 and the CP processing unit 354 of the video receiver 350 and communications between the CPU 305 of the video transmitter 300 and the EDID storing unit 356 of the video receiver 350 are performed through the AUX-CH unit 309 and the AUX-CH unit 359 which are coupled to each other through an AUX-CH signal line.

In the video transmitter 300, the signal source 301 is a video signal source, and outputs a video signal to the encryption unit 302. The encryption unit 302 encrypts the input video signal with, for example, an HDCP or a DPCP (DisplayPort Contents Protection) to be output to the video/audio signal transmission unit 303. The video/audio signal transmission unit 303 converts the input video signal into a serial transmission method of a Main Link method, and transmits the resultant to the video/audio signal reception unit 353 of the video receiver 350 through a Main Link signal line.

At this time, the CP processing unit 304 performs authentication with the CP processing unit 354 regarding to whether or not the video receiver 350 that is the connection target is provided with a legitimate HDCP processing function, through the AUX-CH signal line. If authenticated, the CP processing unit 304 outputs key information of encryption to the encryption unit 302. Specifically, the encryption unit 302 transmits a video signal obtained by performing a contents protection process for the input video signal on the basis of the key information input from the CP processing unit 304, and accordingly, the video receiver 350 cannot decrypt the video signal without the key information by which the copy protection signal can be decrypted.

The power source unit 308 generates a DC power source voltage of +3.3V from an AC power source (not shown) supplied to the video transmitter, and supplies the voltage to the controlling unit 357 of the video receiver 350 through a +3.3V power source line.

While the CPU 305 sets a format of a signal on the basis of the EDID transmitted from the EDID storing unit 356 of the video receiver 350 to store the format information into the parameter storing unit 310, the CPU 305 gives an instruction on an output format of the video signal to the signal source 301. Then, the CPU 305 controls the video/audio signal transmission unit 303 not to transmit the video signal until the initialization and the above-described CP process are completed.

In the case where the detection unit 307 detects a HPD signal transmitted from the controlling unit of the video receiver 350 through a HPD signal line, the detection unit 307 outputs the detected information of the HPD signal to the CPU 305.

In the video receiver 350, a video signal transmitted from the video transmitter 300 is received by the video/audio signal reception unit 353, and the signal is restored from the serial transmission method to the video signal in the original format to be output to the decryption unit 352. Further, the CP processing unit 354 performs authentication with the CP processing unit 354 regarding to whether or not the video receiver 350 that is the connection target is provided with a legitimate HDCP processing function, through the AUX-CH signal line. If authenticated, the CP processing unit 354 outputs key information of encryption to the encryption unit 302. Specifically, the encryption unit 302 transmits and outputs the video signal obtained by performing a contents protection process on the basis of the key information input from the CP processing unit 304.

As described above, in the case where the information signal capable of decrypting the video signal obtained by performing a contents protection process is input, the decryption unit 352 decrypts the input video signal to be output to the display panel 351 on which the video is displayed.

The EDID storing unit 356 stores data representing the characteristics of the video receiver 350, and the EDID is transmitted to the CPU 305 of the video transmitter 300 through the AUX-CH unit 359, AUX-CH signal line, and the AUX-CH unit 309.

When the system is started, the controlling unit 357 transmits the HPD signal as a trigger to the detection unit 307 of the video transmitter 300.

Figure 8:
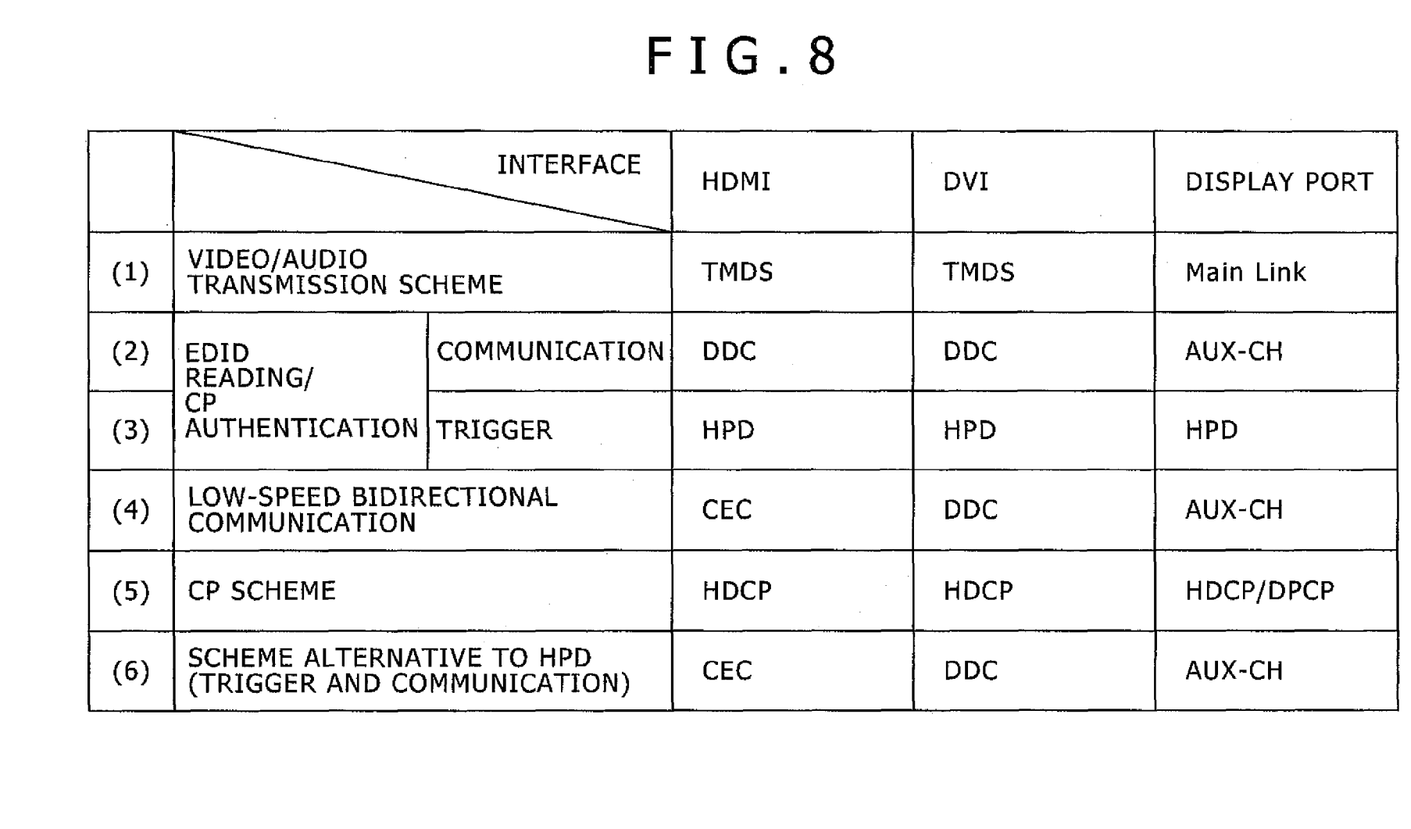
FIG. 8 is a diagram for comparing signal transmission methods for each interface according an embodiment of the present invention.

The types of signals in the respective interface methods in the first to third embodiments will be collectively described using FIG. 8. FIG. 8 is a diagram for comparing each embodiment of the signal transmission method for each interface of the present invention.

In FIG. 8, for three types of connection interfaces (HDMI, DVI, and DisplayPort), (1) shows a video/audio transmission method, (2) shows a communication method of EDID reading/CP authentication, (3) shows a trigger method of EDID reading/CP authentication, (4) shows a low-speed bidirectional communication method, (5) shows a CP method, and (6) shows a trigger method used for the present invention which is alternative to an "H"/"L" switching method of a conventional HPD during transmission and reception of a video signal.

As will be apparent from FIG. 8, according to the first to third embodiments, in the video signal transmission and reception system in which the video transmitter and the video receiver are coupled to each other by any one of the HDMI method, the DVI method, and the DisplayPort method, default setting of a video output format is performed on the basis of the EDID when the power is supplied, and then, the CP authentication process is performed, so that the video interfaces are initialized. Accordingly, it is possible to realize the data reading method, and the video transmitter and the video receiver in which after transmission and reception of the video signal is started, no interruption of a video occurs or an interruption time is short.

What is claimed is:
1. A video transmission system, the system comprising:
a transmitter transmitting a video signal; and
a receiver receiving the video signal that the transmitter transmitted and the transmitter and the receiver are connected to each other through a digital interface;
wherein, the receiver includes an EDID storing unit to store characteristics of the receiver;
the digital interface includes a HPD signal line for transmitting a HPD signal and a CEC signal line for transmitting a CEC signal;
the transmitter reads the EDID of the receiver through the digital interface, and transmits the video signal to the receiver on the basis of the EDID which the transmitter read;
while the HPD signal level is the High level, the receiver transmits a first and a second CEC message related to the EDID of the receiver to the transmitter; and
while the HPD signal level is the High level, the transmitter, which received the first CEC message from the receiver, does not read the EDID of the receiver until the second CEC message is received.

2. A method of reading and rewriting EDID in a video transmission system includes a transmitter transmitting a video signal and a receiver receiving the video signal that the transmitter transmitted which are connected to each other through a digital interface, the method comprising:
a reading step where the transmitter reads the EDID of the receiver through the digital interface, which including a HPD signal line for transmitting a HPD signal and a CEC signal line for transmitting a CEC signal;
a first transmitting step where the transmitter transmit the video signal to the receiver on the basis of the EDID which the transmitter read;
while the HPD signal level is the High level, a second transmitting step where the receiver transmits a first CEC message related to the EDID of the receiver; and
while the HPD signal level is the High level, a third transmitting step where the receiver transmits a second CEC message related to the EDID of the receiver;
wherein the transmitter, which received the first CEC message from the receiver, does not read the EDID of the receiver until the second CEC message is received.

* * * * *